Dec. 13, 1960 — P. H. STAHLHUTH — 2,964,310
SPRING ASSEMBLY FOR RELIEF VALVES
Filed Aug. 26, 1958
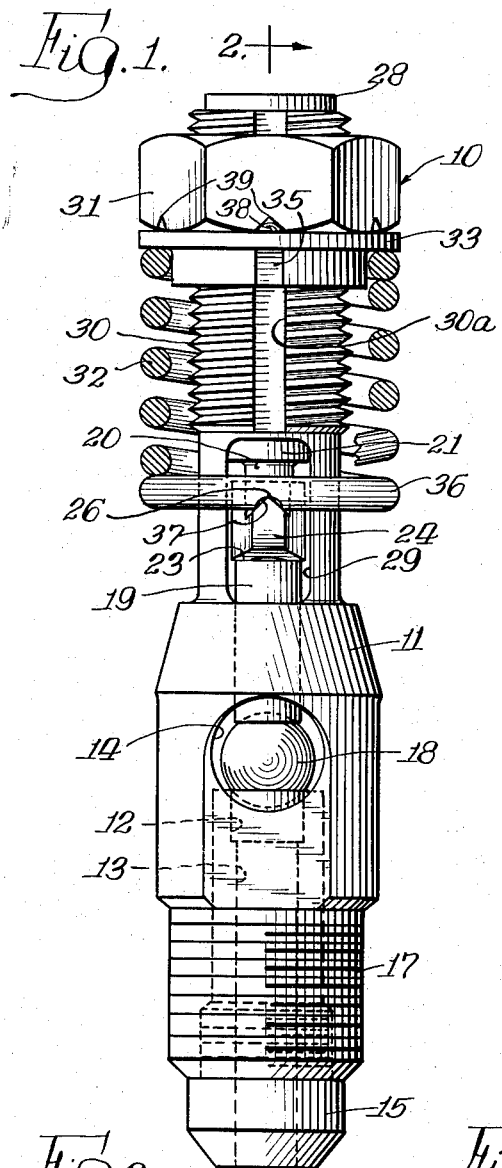
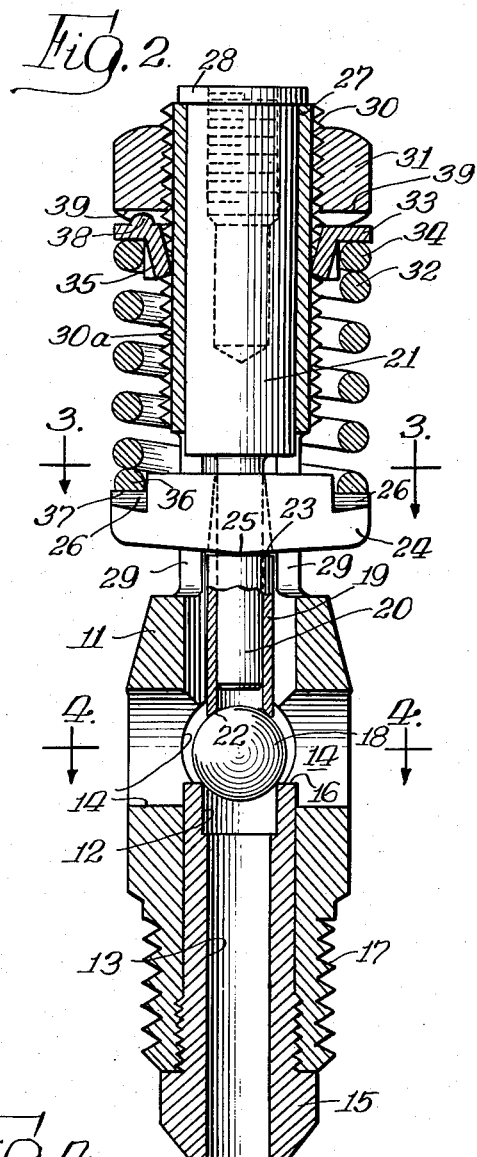
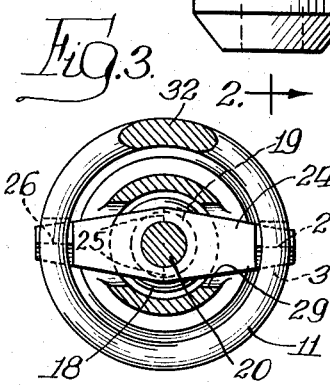
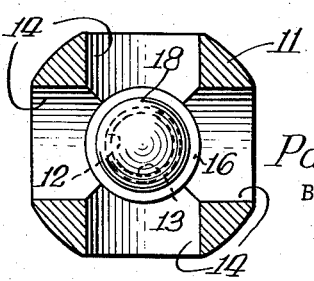
INVENTOR.
Paul H. Stahlhuth
BY Schroeder, Hofgren,
Brady & Wegner
Attys.

2,964,310

SPRING ASSEMBLY FOR RELIEF VALVES

Paul H. Stahlhuth, Granada Hills, Calif., assignor to Sundstrand Corporation, a corporation of Illinois Filed Aug. 26, 1958, Ser. No. 757,322

11 Claims. (Cl. 267—1)

This invention relates to relief valves and in particular to means for controlling the movable valve member in such valves.

The proper operation of relief valves in such critical applications as military rockets has posed a number of problems. Not only must the valve be capable of functioning properly at elevated temperatures such as 2,500° F., but such valves must be capable of maintaining maximum chamber pressures of up to 1,000 plus or minus 125 while controlling hot gases which contain carbon particles and other corrosive material.

One object of the instant invention is to provide a new and improved means for controlling movement of the valve member of a relief valve.

Another object is to provide such means wherein the control spring thereof is spaced substantially from the flow passage of the valve to preclude undesirable contact of the controlled gases with the spring.

A further object is to provide such means wherein the control spring is associated with the valve member in a new and improved manner to eliminate the effect of unbalance in the spring.

Still another object is to provide such a means including a follower retentively engaging the movable valve member, wherein said means is arranged to provide an accurately coaxial urging by the spring of the follower against the valve member.

Still another object is to provide such a means arranged to provide substantially reduced friction in the operation thereof.

Yet another object is to provide such a means including an operating bar extending transversely to a transverse shoulder of the follower, the operating bar having a wedge shaped mid-portion pivotally engaging that shoulder, and a coil spring for biasing the valve member to a closed position disposed coaxially of the follower and having diametrically opposite portions at one end bearing against wedge shaped outer portions of the operating bar to permit ready pivotal adjustment of the engagement of the spring end with the bar outer portions.

Further objects and advantages will be apparent from the following detailed description taken in connection with the accompanying drawings, in which:

Fig. 1 is an enlarged elevation of a relief valve having valve member controlling means embodying the invention, a portion of the spring being broken away;

Fig. 2 is a diametric section thereof taken approximately along the line 2—2 of Fig. 1;

Fig. 3 is a transverse section thereof taken approximately along the line 3—3 of Fig. 2; and Fig. 4 is a transverse section thereof taken approximately along the line 4—4 of Fig. 2.

While this invention is susceptible of embodiments in many different forms, there is shown in the drawings and will herein be described in detail one embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawing, a relief valve 10 is shown to comprise a body 11 provided with a flow passage 12 including an inlet portion 13 and outlet portions 14. The inlet portion 13 is defined by a tubular, stainless steel insert 15 terminating at its inner end in an annular valve seat 16. To permit connection of the relief valve to the device to be controlled (not shown), the body may be exteriorly threaded, as at 17.

Flow of fluid from inlet passage portion 13 to outlet passage portions 14 is controlled by a ball valve member 18 which seats on valve seat 16. Valve member 18 is preferably formed of a high temperature corrosion and erosion resistant material such as stainless steel. The instant invention is concerned with the means for controlling the movement of the valve member 18 from its seated engagement with valve seat 16 whenever a predetermined pressure of the fluid in inlet 13 is exceeded. Herein, this means includes a tubular follower 19 concentrically slidable on a stem portion 20 of a guide 21. The inner end 22 of follower 19 retentively engages the valve member 18. The opposite, outer end of the follower defines a transverse shoulder 23 which is engaged by an operating bar 24 to urge the follower longitudinally toward valve seat 16.

Operating bar 24 herein comprises a yoke extending freely around guide stem 20. The lower edge mid-portion 25 of yoke 24 is wedge shaped to have pivotal engagement with shoulder 23 of follower 19 at diametrically opposite portions thereof. The yoke extends laterally from mid-portion 25 to define a pair of opposite outer portions 26. Outer portions 26 are wedge shaped pointing upwardly oppositely to wedge shaped mid-portion 25 and extending at right angles thereto.

Valve body 11 includes a generally tubular portion 27 extending oppositely away from inlet passage portion 13. Guide 21 is retained in tubular portion 27 by head portion 28 with stem portion 20 disposed coaxially of valve seat 16 to align follower 19 properly with ball valve 18. Laterally of follower outer end 23, tubular portion 27 is provided with diametrically opposite openings 29 through which the yoke extends. The outer end 30 of tubular portion 27 is exteriorly threaded and a nut 31 is adjustably threaded thereon. Extending between nut 31 and outer portions 26 of yoke 24 concentrically of body portion 27 is a stainless steel coil spring 32. An annular retainer 33 is disposed between the outer end 34 of spring 32 and nut 31 to facilitate adjustment of the spring tension by suitable advancing or withdrawing threading of nut 31 on body threaded end 30. Retainer 33 is provided with a pair of tabs 35 sliding in corresponding grooves 30a in tubular portion end 30 to lock retainer 33 against rotation and thereby precludes transmission of rotational forces from nut 31 to spring outer end 34.

The inner end 36 of the spring 32 is provided with diametrically aligned notches 37 which engage the tips of the wedge shaped outer portions 26 of yoke 24 to urge the yoke mid-portion 25 forcibly against follower shoulder 23. The notches are arranged perpendicular to the spring center line and are preferably segmentally cylindrical having a small radius, such as .01". By virtue of the wedge shape of portions 26, the spring 32 automatically pivotally adjusts its engagement with the yoke. By virtue of the wedge shape of mid-portion 25 of the yoke, the yoke automatically pivotally adjusts its engagement with transverse shoulder 23 of the follower. As these two pivotal adjustments are about axes perpendicular to each other, any asymmetric unbalance of the urging force of spring 32 is compensated, permitting the follower 19 to have true coaxial movement relative to stem 20 and substantially reducing frictional forces therebetween. Further, as the guide stem 20 extends into follower 19 through outer end 23 thereof, sticking of the follower on the valve stem is substantially eliminated as this entrance is substantially removed from the flow path through the passage 12.

The operating pressure of the relief valve is determined by the setting of nut 31. To retain the nut in a desired setting, while allowing ready adjustment thereof on threaded end 30 of tubular portion 27, retainer 33 is provided with an upstanding projection 38 which engages selectively a plurality of co-operating radial notches 39 in nut 31. Illustratively, eight equally spaced notches may be provided in the nut, permitting the nut to have small-increment adjustability for improved accurate control of the spring tension.

Whenever the pressure in inlet passage portion 13 exceeds a predetermined pressure as determined by the setting of nut 31, ball member 18 is urged upwardly away from valve seat 16 against the action of spring 32. The pressure is relieved through outlet passages 14, the fluid being discharged in a direction substantially away from the means for controlling the movement of the valve member. Thus, the movement controlling elements of the relief valve are effectively protected from the corrosive action of the hot gases, substantially extending the useful life of the valve. Further, the novel automatic centering action of the spring relative to the follower 19 provides an improved operation of the follower resulting in more accurate pressure control and extended useful life. Such a pressure relief valve offers a substantial value advantage in applications such as missile rocketry where such improved functioning may make the difference between successful and unsuccessful operation of an entire, very costly device.

I claim:

1. A spring assembly for a relief valve having means providing a flow passage and a valve member movably disposed in the flow passage for releasably closing the flow passage, said spring assembly comprising: a support member having a bore, an elongated follower longitudinally movable through said bore and having an operating end portion and a transverse shoulder spaced from and facing away from said end portion, an operating bar extending transversely of said follower and having a midportion pivotally engaging said shoulder and opposite outer pivot portions, and a coil spring biasing the follower toward movement in one direction, said coil spring being disposed coaxially of the follower and surrounding the support member and having diametrically opposite portions at one end thereof bearing pivotally against the outer pivot portions of the operating bar, the other end of said spring abutting a stationary member on said support member.

2. A spring assembly for a relief valve having means providing a flow passage and a valve member movably disposed in the flow passage for releasably closing the flow passage, said spring assembly comprising: a support member having a bore, a guide carried by the support member and including a stem; a tubular follower slidable on said stem and having an operating end and a transverse shoulder spaced from and facing away from said end portion; an operating bar extending transversely of said follower and having a midportion pivotally engaging said shoulder and opposite outer pivot portions; and a coil spring biasing the follower toward movement in one direction, said coil spring surrounding the support member and having diametrically opposite portions at one end thereof bearing pivotally against said outer pivot portions of the operating bar, the other end of said spring abutting a stationary member on said support member.

3. The spring assembly of claim 2, wherein the operating bar comprises a yoke extending around said stem.

4. A spring assembly for a relief valve having means providing a flow passage and a valve member movably disposed in the flow passage for releasably closing the flow passage, said spring assembly comprising: a support member having a bore, a follower longitudinally movable through said bore and having an operating end and a transverse shoulder spaced from and facing away from said end portion; an operating bar extending transversely to said follower and having a wedge shaped midportion pivotally engaging said shoulder and opposite outer pivot portions; and a coil spring biasing the follower toward movement in one direction, said coil spring surrounding the support member and having diametrically opposite portions at one end thereof bearing pivotally against said outer pivot portions of the operating bar, the other end of said spring abutting a stationary member on said support member.

5. A spring assembly for a relief valve having means providing a flow passage and a valve member movably disposed in the flow passage for releasably closing the flow passage, said spring assembly comprising: a support member having a bore, a follower longitudinally movable through said bore and having an operating end and a transverse shoulder spaced from and facing away from said end portion; an operating bar extending transversely to said follower and having a midportion pivotally engaging said shoulder and opposite wedge shaped outer portions; and a coil spring biasing the follower toward movement in one direction, said coil spring surrounding the support member and having diametrically opposite portions at one end thereof bearing against said outer portions of the operating bar, the other end of said spring abutting a stationary member on said support member.

6. A spring assembly for a relief valve having means providing a flow passage and a valve member movably disposed in the flow passage for releasably closing the flow passage, said spring assembly comprising: a support member having a bore, a follower longitudinally movable through said bore and a transverse shoulder spaced from and facing away from said end portion; an operating bar extending transversely to said follower and having a wedge-shaped midportion pivotally engaging said shoulder and opposite wedge-shaped outer portions; and a coil spring biasing the follower toward movement in one direction, said coil spring surrounding the support member and having diametrically opposite portions at one end thereof bearing against said outer portions of the operating bar, the other end of said spring abutting a stationary member on said support member.

7. The spring assembly of claim 6 wherein said diametrically opposite portions of the coil spring end define bar retaining notches.

8. The spring assembly of claim 7 wherein retaining means are associated with the support member for maintaining said notches of the spring aligned with said wedge shaped outer portions of the operating bar.

9. A spring assembly for a relief valve having means providing a flow passage and a valve member movably disposed in the flow passage for releasably closing the flow passage, said spring assembly comprising: a support member having a bore, an exteriorly threaded tubular support extending coaxially from said support member; a guide longitudinally reciprocable in said tubular support; a follower slidable on said guide; an operating bar extending transversely of said support and engaging said guide; a coil spring surrounding said support and having one end bearing against said operating bar, the other end of said spring abutting a stationary member on said support; an annular member on said support outwardly of the spring and having a detent received in a longitudinally extending groove in said support to permit longitudinal movement of the annular member while precluding angular movement thereof; and a nut threaded on said support and engaging said annular member to compress the spring adjustably against the operating bar.

10. The spring assembly of claim 9 wherein the annular member and nut are provided with co-operating projecting and recessed means for locking the nut releasably against rotation.

11. A spring assembly for a relief valve having means providing a flow passage and a valve member movably disposed in the flow passage for releasably closing the flow passage, said spring member comprising: a support member having a bore, a guide carried by the support member and including a stem; a tubular follower coaxially slidable on said stem and having an operating end portion and a transverse shoulder spaced from and facing away from said end portions; a yoke freely movable on said stem and extending transversely therefrom and having a wedg-shaped midportion pivotally engaging said shoulder and opposite wedge-shaped outer portions; and a coil spring biasing the follower toward movement in one direction, said coil spring surrounding the support member and having diametrically opposite notched portions at one end thereof bearing against said wedge-shaped outer portions of the yoke, the other end of said spring abutting a stationary member on said support member.

References Cited in the file of this patent

UNITED STATES PATENTS

| | | |
|---|---|---|
| 775,271 | Graham | Nov. 15, 1904 |
| 1,841,029 | Hamilton | Jan. 12, 1932 |
| 1,877,938 | Moore | Sept. 20, 1932 |
| 1,924,973 | Beede | Aug. 29, 1933 |
| 2,547,862 | Gilmore | Apr. 3, 1951 |
| 2,690,818 | Janeway | Oct. 5, 1954 |